C. A. BEEMER.
CURTAIN FASTENER.
APPLICATION FILED JAN. 22, 1921.
1,420,177.
Patented June 20, 1922.
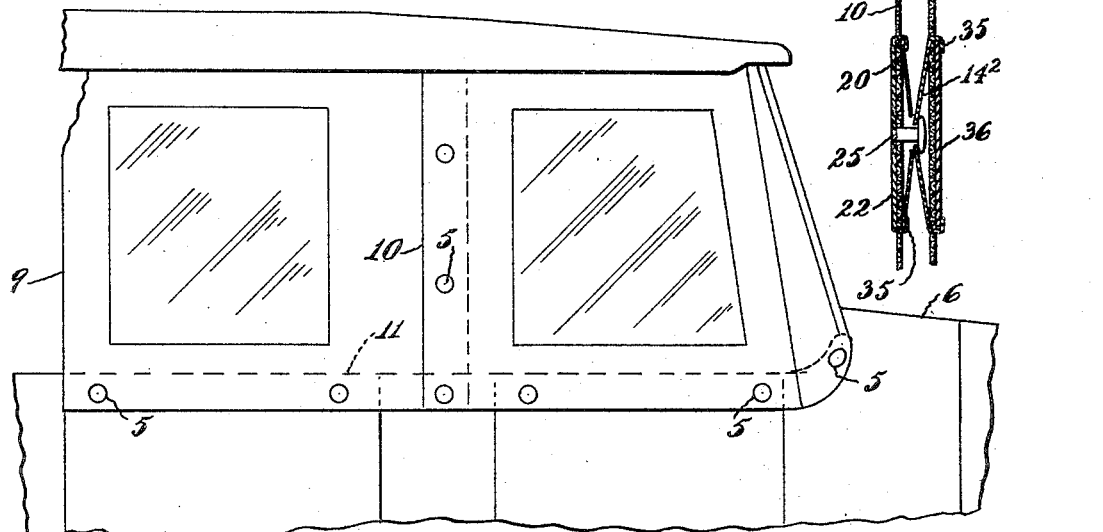
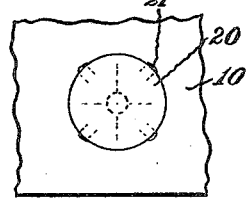
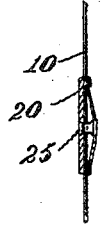
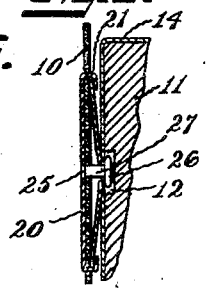
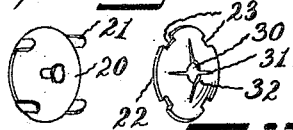
Witnesses:
L. C. Badeau
H. D. Penney
Inventor:
Clarence A. Beemer,
By his Att'y, T. H. Richards

UNITED STATES PATENT OFFICE.

CLARENCE A. BEEMER, OF WESTFIELD, NEW JERSEY.

CURTAIN FASTENER.

1,420,177.  Specification of Letters Patent.  Patented June 20, 1922.

Application filed January 22, 1921. Serial No. 439,230.

*To all whom it may concern:*

Be it known that I, CLARENCE A. BEEMER, a citizen of the United States, residing in Westfield, in the county of Union and State of New Jersey, have invented certain new and useful Improvements in Curtain Fasteners, of which the following is a specification.

This invention relates to improvements in curtain fasteners for automobiles and the like; but the invention is not limited to automobile-curtain fasteners or even to curtain fasteners, as the fasteners may have general application.

Objects of the invention are to provide inexpensive, durable, easily operated and applied fasteners suitable for application to new or old automobiles, and to provide fasteners for fastening the curtains to each other or to the automobile body or other support.

Other objects of the invention will appear as the description proceeds; and while herein minute details of the invention are described, the invention is not limited to these, since many and various changes may be made without departing from the scope of the invention as claimed.

In the accompanying drawing, showing by way of example several of many possible embodiments of the invention, Figure 1 is a fragmental side elevation showing the fasteners applied to automobile curtains;

Fig. 2 is an enlarged outer face view of one of the fasteners;

Figs. 3 and 4 are vertical central sections showing the outer member of the fastener, and one form of the recessed support or automobile body, the parts being disengaged;

Fig. 5 is a face view of the recessed support;

Fig. 6 is a vertical sectional view showing said outer member and support attached and drawn to a larger scale;

Figs. 7 and 8 are perspectives of the elements, detached, of the outer member of the fasteners, and drawn to about the scale of Figs. 2 to 5;

Figs. 9 and 10 are face view and vertical section of another form of recessed support;

Fig. 11 is a vertical sectional view of outer and inner members, attached, and securing together two curtains or other sheets; and Figs. 12 and 13 are perspectives of elements of the inner member of Fig. 11.

My improved fasteners 5 are shown in combination with an automobile 6 having curtains 9 and 10 and a body door 11 or other suitable support to which the curtains are fastened.

Said body portion or support 11 is provided with small recesses 12 (Fig. 6); and a metallic sheath 14 or other locking plate secured on said support is provided with an elongated opening 15 (Fig. 5) registering with said recess 12 and comprising a large substantially round end portion 16 and a narrow reduced and intermediate portion 17 forming shoulders on the inner face of the plate.

A round retaining plate 20 disposed on the outer face of said curtain has edge projections 21 passing through the curtain and having inwardly turned ends (Fig. 6) turned approximately toward the center of said plate, and engaging over a friction disk 22 clamped on the inner face of the curtains by said projections and having peripheral notches 23 receiving said projections 21.

A stud 25 riveted centrally of said retaining plate is passed through the curtains and has a substantially flat circular head 26 on its inner end spaced a distance from said curtain and adapted to pass through said enlarged end portion 16 into said recess 12 to engage behind said shoulders when the shank 27 of said stud is received in said reduced end portion 17.

The mid-portion of the disk 22 is provided with a central orifice 30 receiving said shank 27 and radial slits 31 forming therebetween yieldable outwardly pressed spring portions 32 inclined away from the inner face of the curtain to near said head 26 and adapted to press against said retaining plate when the stud is in locking position in said reduced end, thereby to frictionally hold said stud against accidental displacement from locking position. The stud 25 and locking plate 14 are so arranged that the ordinary strains on the curtain holds the stud in locking position in the reduced portion 17.

Sometimes, as when the sheath 14 is already on the support 11, it is not practicable to have the metallic sheath 14 itself provided with the elongated locking opening 15. In this case, I may bore through the sheath 14 into the support 11 (Fig. 10) to provide a round recess 12' to receive a threaded metallic thimble 13 having its outer wall 14' forming a locking plate provided with the elongated opening 15 (Fig. 9) comprising the large end portion 16 and reduced portion 17.

When the two curtains 9 and 10 are fastened together, instead of the supports 11 being provided with the small recess in its face, I use a round metallic locking disk $14^2$ secured to the flexible curtain or sheet 9 (Figs. 11 to 13), said disk having edge projections 35 passing through the curtain 9 and having inwardly turned ends turned approximately toward the center of said plate and clamped upon a backing plate 36 and received in the notches 37 thereof. The locking disk $14^2$ consists of a very flat cone whereby its central portion is held away from the curtain 9. Said central portion is provided with a locking opening 15 (Fig. 12) similar to that shown in Fig. 5 and comprising a large substantially round end portion and a narrow reduced and intermediate portion forming shoulders on the inner face of the plate for the reception of the stud 25 of the fastenings 5, arranged and mounted as previously described.

The operation of the device is obviously simple. The head 26 of the stud 25 is merely passed through the enlarged portion 16 and then moved until the shank 27 is disposed in the reduced portion 17, where it is held by friction of the friction disk 22. The reduced end 17 is so directed that any pull on the curtain pulls the stud 27 against the closed end of the portion 17. Reverse movement unfastens the device.

Having thus described my invention, I claim:

1. In combination, a locking member provided with a recess; a retaining headed stud having its shank receivable in said recess; and a yieldable means connected to the stud and engaging the locking member to yieldably hold the stud against accidental removal from said recess.

2. In combination, a locking member provided with a recess; a retaining member; a headed stud secured to the retaining member and having its shank receivable in said recess and means carried by the retaining member and engaging the locking member for yieldably holding the shank against accidental removal from said recess.

3. In combination, a locking member provided with a recess having a reduced portion; a retaining member; a headed stud secured to the retaining member and having its shank receivable in said reduced portion; and a yieldable means carried by the retaining member and engaging the locking member.

4. In combination, a locking plate provided with an opening having a reduced portion; a retaining plate; a headed stud riveted thereto and having its shank receivable in said reduced portion; and a yieldable means carried by the retaining plate and engaging the locking plate.

5. In combination, a locking plate provided with an opening having a large portion and a reduced portion forming shoulders; a flexible sheet; a retaining plate on the outer face of the sheet; a stud riveted to the retaining plate and passing through the sheet and said opening and having its head locking behind said shoulders; and a friction disk on the inner face of said sheet and yieldably engaging the locking plate when the stud head is thus locked; said reduced portion being so directed that strain on the sheet holds the stud in locking position.

6. In combination, a locking plate provided with an opening having a large portion and a reduced portion forming shoulders; a flexible sheet; a retaining plate on the outer face of the sheet; a stud riveted to the retaining plate and passing through the sheet and said opening and having its head locking behind said shoulders; and a friction disk on the inner face of said sheet and secured to said retaining plate; the mid portion of the disk having a central orifice receiving said shank, and radial slits forming therebetween yieldable outwardly pressed spring portions inclined away from the inner face of the curtain to near said head and adapted to press against said locking plate when the stud is in locking position in said reduced end, thereby to frictionally hold said stud in locking position; said stud and locking plate being so arranged that the strain on the curtain holds the stud in locking position.

7. In combination, a pair of flexible sheets; a locking plate secured to one of the sheets and provided with an opening having a reduced portion; a retaining plate secured to the other sheet; a headed stud riveted thereto and having its shank receivable in said reduced portion; and a yieldable means carried by the retaining plate and engaging the locking plate.

8. In combination, an inner sheet; a locking plate secured thereto and provided with an opening having a large portion and a reduced portion forming shoulders; a flexible outer sheet; a retaining plate on the outer face of the outer sheet; a stud riveted to the retaining plate and passing through the sheet and said opening and having its head locked behind said shoulders; and a friction disk on the inner face of said outer sheet and yieldably engaging the locking plate when the stud head is thus locked; said reduced portion being so directed that strain on the sheets holds the stud in locking position.

9. In combination, an outer curtain; an inner curtain; a round locking plate on the face of said inner curtain and having edge projections passing through the curtain and having inwardly turned ends turned approximately toward the center of said plate; said locking plate having a locking opening comprising a large substantially round end portion and a narrow reduced and intermediate portion forming shoulders on the inner face of the plate; a backing disk clamped on the back face of the inner curtain by said projections and having peripheral notches receiving said projections; a retaining plate on the outer face of the outer sheet; a stud riveted to the retaining plate and passing through the sheet and said opening and having its head locked behind said shoulders; and a yieldable means carried by the retaining plate and engaging the locking plate.

CLARENCE A. BEEMER.

Witnesses:
JOHN MORRIS,
H. D. PENNEY.